Sept. 27, 1966    R. C. ERHART ETAL    3,275,275
MOUNTING WITH ELASTOMERIC STRUTS
Filed March 21, 1963

INVENTORS
Robert C. Erhart
BY Jack M. Weaver

Ralph Hammar
Attorney 3,275,275
MOUNTING WITH ELASTOMERIC STRUTS
Robert C. Erhart, Erie, Pa., and Jack M. Weaver, Dayton, Ohio, assignors to Lord Corporation, a corporation of Pennsylvania
Filed Mar. 21, 1963, Ser. No. 266,898
1 Claim. (Cl. 248—358)

This invention is a mounting for missiles and the like required cushioning in all directions. The mounting has an inner ring for attachment to the missile, an outer ring for attachment to a support, and struts of suitable elastomer forming a load carrying connection between the rings. In end view, the struts form a polygon with the corners of the polygon joined to the outer ring and with the sides of the polygon dished inward and joined to the inner ring.

Figures 1, 2:
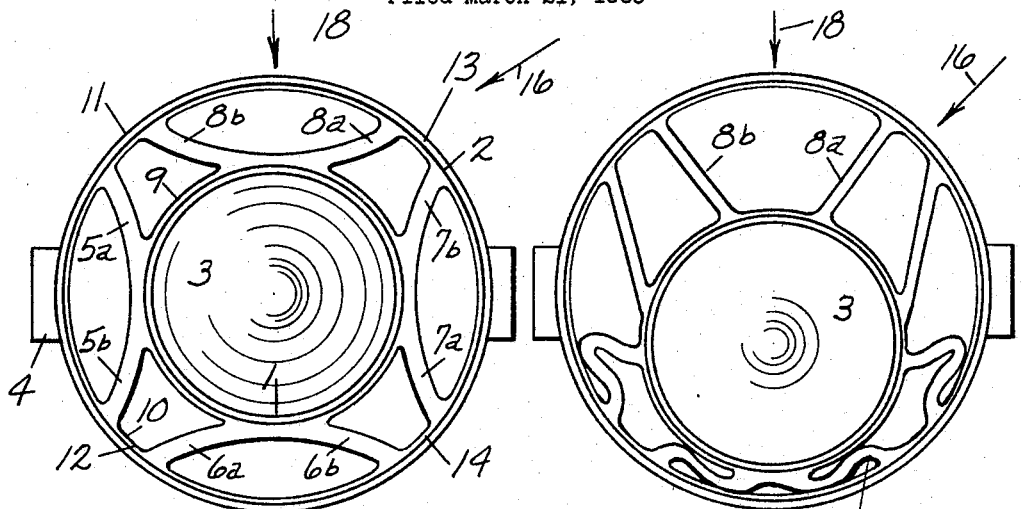
Figure 3:
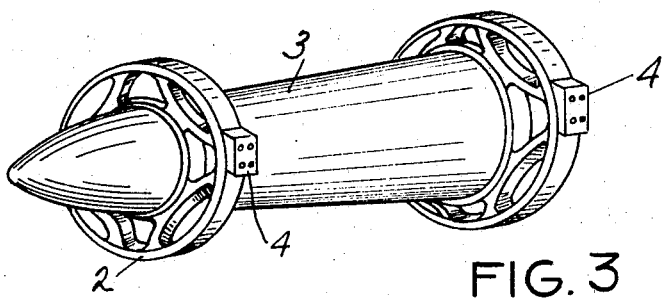
Figure 4:
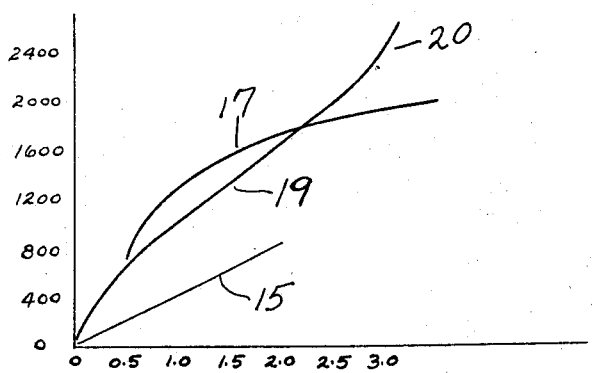

In the drawing, FIG. 1 is an end view of a missile nose cone mounting in the unloaded condition, FIG. 2 is a perspective of the mounting in the fully loaded condition, FIG. 3 is a perspective of the mountings installed on a missile nose cone, and FIG. 4 shows load deflection curves for radial and axial loads.

The mounting has an inner ring 1 and an outer ring 2 radially spaced from the inner ring. The rings need not be cylindrical and may be made in several pieces or segments. In one use, shown in FIG. 3, two or more of the mountings are spaced apart along the length of a missile nose cone 3. The inner rings 1 are fixed to the nose cone. The outer rings 2 are provided with pads 4 for attachment to a shipping container. It is intended that the mountings remain in place on the missile after removal from the shipping container to provide further protection against rough handling.

The cushioning is provided by pairs of struts 5a, 5b, 6a, 6b, 7a, 7b, 8a, 8b of rubber or other suitable elastomer. The struts extend generally chordwise of the outer ring 2 and the struts of each pair are in substantially direct continuation of each other. The outer end of each strut is bonded to the inner surface of the ring 2 and the inner end of each strut is bonded to the outer surface of the inner ring 1. The bonding takes place during the molding operation and there is a skin 9 of rubber on the outer surface of the inner ring and a skin 10 of rubber on the inner surface of the outer ring. The skins 9 and 10 improve the bond between the struts and the rings and provide additional cushioning at extreme loads.

In end view, each pair of struts constitutes generally one side of a polygon which is dished inwardly into contact with the outer surface of the inner ring. For example, the pair of struts 5a, 5b would be one side of a square having its corners 11, 12, 13, 14 respectively at the junction of the struts 5a, 8b; 5b, 6a; 6b, 7a; and 7b, 8a. A greater or lesser number of pairs of struts may be used in case polygons of different number of sides are desired.

Under axial load, all of the struts are deflected in shear, producing the characteristic load deflection curve 15 illustrated in FIG. 4. Under radial loads the deflection curve varies depending upon the direction in which the radial load is applied. In the direction of arrow 16 or a load applied at one of the corners of the polygon, the load deflection curve is substantially that illustrated at 19. When the load is applied in the direction of arrow 18 or perpendicular to one of the sides of the polygon, the load deflection curve is substantially that illustrated at 17. From this, it can be seen that the behavior of the mounting under radial loads is quite uniform. The variation between the extreme positions indicated by arrows 16 and 18 is not great and the differences would decrease as the number of pairs of struts was increased. For most purposes, more than four pairs of struts is unnecessary.

The length to thickness ratio of the struts is such that the struts buckle at loads above a threshold. This results in greater energy absorption, for example, under the shocks encountered during shipping and rough handling. At loads below the threshold, the struts deflect without buckling as is desirable for vibration isolation.

The buckling of the struts is diametrically opposite the applied load as indicated at 21 in FIG. 2. The buckling folds the elastomer, producing a mass of elastomer loaded in compression where the stiffness is substantially greater. This buckling action takes place under all radial loads above the threshold. For loads in the direction of arrow 16, there is an increase in stiffness at the loads indicated by the numeral 20. This is an extreme condition beyond the ordinary service loads of the mounting.

The connections between the rings 1 and 2 consist of columns of length to thickness ratio such that the columns buckle under radial compression loads exceeding a predetermined threshold.

What is claimed as new is:

A mounting comprising inner and outer rings with the outer surface of the inner ring presented toward and radially spaced from the inner surface of the outer ring, the inner ring being adapted to be connected to a supported member and the outer ring being adapted to be connected to a support, and a plurality of elastomeric struts between the inner and outer rings, each strut having its inner end bonded to the outer surface of an inner ring and its outer end bonded to the inner surface of the outer ring with which it is associated, said struts forming in elevational view a polygon with the corners of the polygon joined to the outer ring and with the sides of the polygon joined to the inner ring midway between the corners, said struts being columns of length to thickness ratio such that the columns buckle under radial compression loads exceeding a predetermined threshold.

References Cited by the Examiner

UNITED STATES PATENTS

| 2,387,295 | 10/1945 | Robertson | 248—74 |
| 2,395,745 | 2/1946 | King | 248—74 |
| 2,670,166 | 2/1954 | Applegate | 248—119 |
| 2,756,013 | 7/1956 | Cunningham | 248—26 |
| 2,936,141 | 5/1960 | Rapata | 248—26 |
| 2,952,430 | 9/1960 | Garman | 248—74 X |
| 3,028,138 | 4/1962 | Wells | 248—358 |
| 3,054,587 | 9/1962 | Hebenstreit et al. | 248—74 |

FOREIGN PATENTS 496,826  10/1919  France.

CLAUDE A. LE ROY, *Primary Examiner.*

SAMUEL FEINBERG, *Examiner.*

R. F. STAHL, J. PETO, *Assistant Examiners.*